Figure 3:
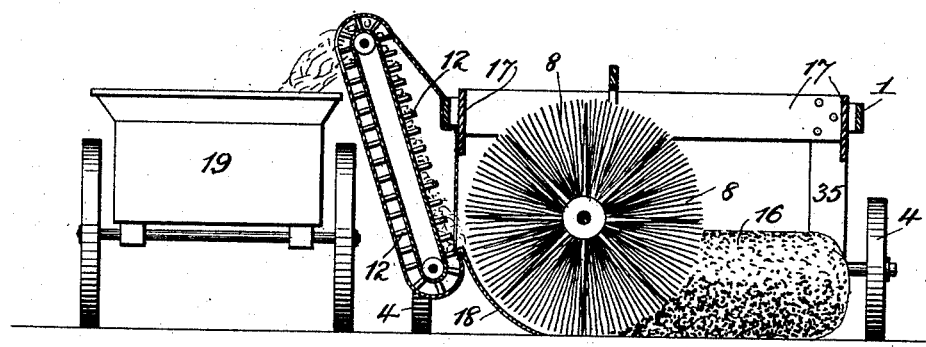

(No Model.)  2 Sheets—Sheet 1.
J. H. REYNOLDS.
STREET SWEEPER.
No. 524,563.　　　　　　　Patented Aug. 14, 1894.
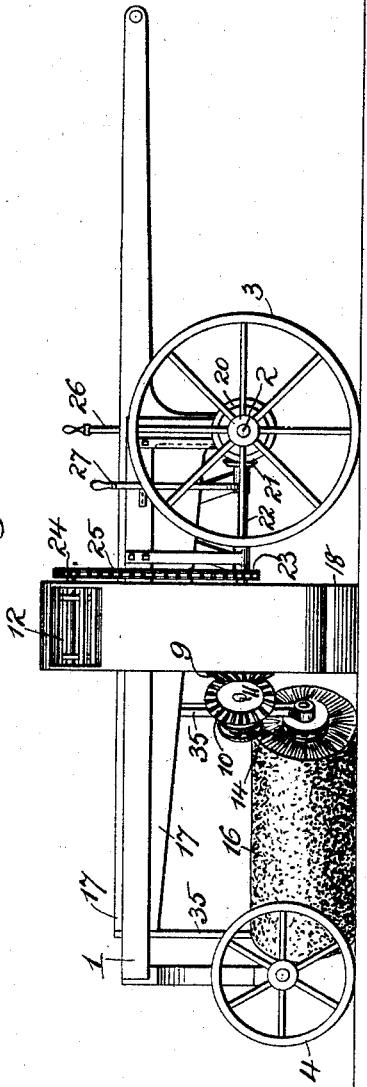
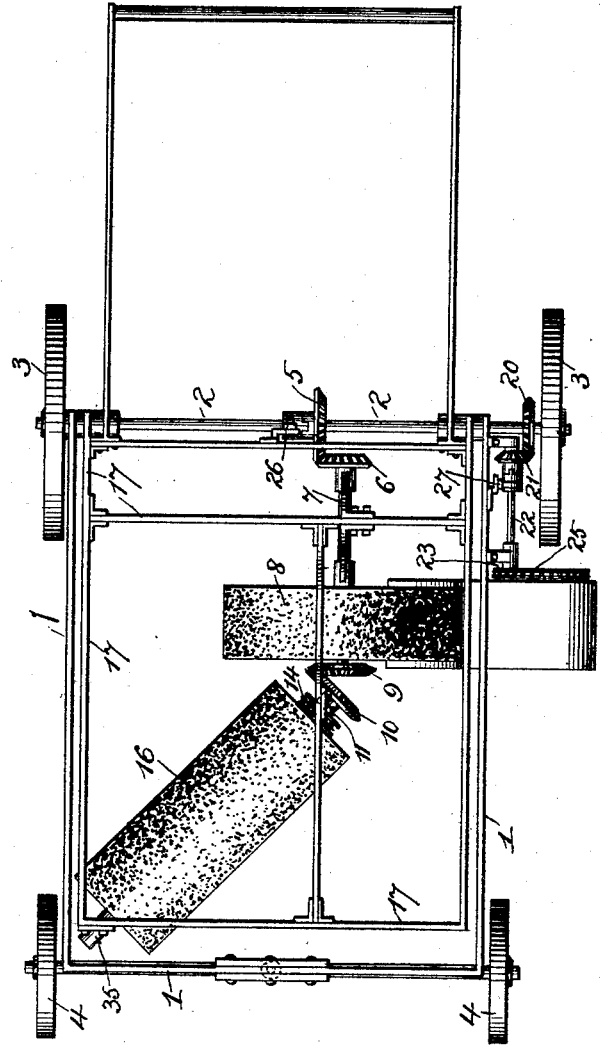
Witnesses　　　　　　　　　　Inventor
Wm. F. Henning　　　　　　John H. Reynolds
Wm. M. Rheem.　　　　　　by Frank T. Brown, Atty (No Model.) 2 Sheets—Sheet 2.

J. H. REYNOLDS.
STREET SWEEPER.

No. 524,563. Patented Aug. 14, 1894.

UNITED STATES PATENT OFFICE.

JOHN HUDSON REYNOLDS, OF CHICAGO, ILLINOIS.

STREET-SWEEPER.

SPECIFICATION forming part of Letters Patent No. 524,563, dated August 14, 1894.

Application filed May 10, 1893. Serial No. 473,700. (No model.)

*To all whom it may concern:*

Be it known that I, JOHN HUDSON REYNOLDS, a citizen of the United States, residing at Chicago, county of Cook, State of Illinois, have invented a new and useful Loading Street, Floor, and Platform Sweeper, of which the following is a specification, reference being had to the accompanying drawings, forming a part thereof.

The object of my invention is to produce a sweeper which will automatically collect the sweepings and deliver them into some suitable receptacle.

The invention consists in substantially the construction set forth in the accompanying specification, illustrated in the drawings and more particularly pointed out in the claims.

Like numerals refer to the same parts in the several figures of the drawings, in which—

Figure 4:
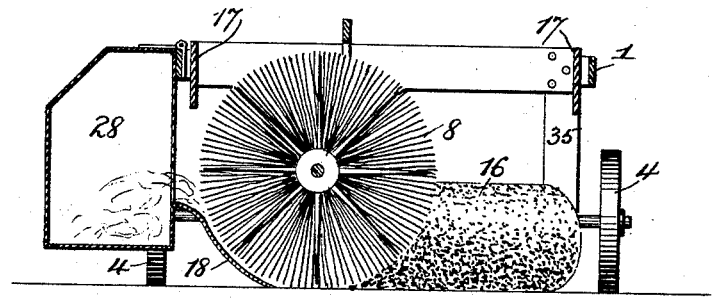

Figure 1, is a side elevation of the sweeper. Fig. 2 is a plan or top view illustrating the same. Fig. 3 is a cross section, and showing the sweeper in position to load into a cart. Fig. 4 is a similar view except that a dump box is shown in position to receive the sweepings instead of the cart.

The numeral 1 represents the main frame of the machine formed of any suitable material and to which draft appliances may be attached in front. This frame carries an axle 2 which is journaled therein and the ends of which are secured to wheels, 3, 3, whereby the axle is caused to turn with the wheels. These wheels and axle are located at the rear of the frame; but at the front I prefer to arrange a smaller pair of wheels, 4, 4, supported on an axle which latter is so pivoted to the frame that it may turn under the same when desired in the usual manner or ordinary truck wheels.

Within the main frame 1 is a smaller frame, 17, which is supported and pivoted upon the rear axle 2, at one end, and at its other or forward end is supported upon brackets 35, 35 journaled to the axle of the diagonal brush or broom, 16, as is shown in Fig. 1 of the drawings. To this inside frame, 17, are also secured the broom or brooms, and the gearing for operating the brooms and the apron, hereinafter to be referred to. By this construction the brooms and apron may be lifted from the ground by raising the forward end of the inside frame directly by hand, or by any suitable mechanism, and causing said frame to turn upon the axle 2 and consequently such sweeping mechanism proper is capable of being lifted independently of the main frame.

The rear axle 2 is provided with a bevel gear 5 which meshes with a similar gear 6 on the end of a short shaft 7, which upon its other end has a bevel gear 9 which in turn meshes with a bevel gear 10, upon the shaft 11, and consequently drives a sprocket 14 upon such shaft, which is connected with the sprocket 13 on the axle of the diagonal sweeper by a chain, and so communicates motion or revolutions to the broom or sweeper, 16, and in the direction which will cause the dirt or other sweepings to be carried within the line of travel of the machine, and in the path of the broom 8. This broom, 8, is fixedly secured to the short shaft, 7, before mentioned which shaft extends longitudinally of the main frame and is secured in depending brackets from the inner frame. The axle, 2, is provided outside of the main frame with a bevel gear, 20, which meshes with a bevel pinion 21, arranged upon one end of the short shaft, 22, which latter is secured by brackets to the outer frame, and carries upon its other end a sprocket wheel, 23, through which together with the sprocket chain, 25, and another sprocket wheel, 24, a traveling motion is imparted to the apron 12, which is arranged at an inclined position with its lower end adjacent to the transverse brush 8, or to a curved plate or guide, 18. The upper end of the apron 12 extends to a point clear of the machine and in position to transfer its load of dirt or other sweepings to any suitable receptacle, whether the same be a cart as shown at 19 in Fig. 3, or a permanent receptacle as shown at 28 in Fig. 4 of the drawings.

The apron, if desired, may be dispensed with and the curved plate, 18, may lead directly to the receptacle, as is shown in Fig. 4 of the drawings, in which a dumping box is shown as hinged to the machine.

The curved guide plate 18 is preferably pivotally supported by the frame work of the machine, and arranged so as to fit closely to the broom or brush, and its lower end extends near to the surface from which the sweepings are taken.

I have provided lever 26, which is pivoted in the inner frame 17, and is connected at its lower end to a sliding part of a separable clutch mechanism splined on shaft 2 in the usual manner. The hub of gear 5 is formed into a clutch jaw as indicated in the drawings and is adapted to be engaged by the sliding part above referred to. By rocking lever 26 the movable part of the clutch may be thrown into and out of engagement with the hub of gear 5, and hence said gear may be thrown into and out of operation. A similarly arranged clutch mechanism may be provided for throwing gear 21 into and out of operation through pivoted lever 27, as shown.

It is manifest that modifications may be made in the details of the construction shown and described without departing from the principle of the invention.

The operation of my sweeping machine is as follows: The brush or broom 16 is arranged diagonally of the machine in the front part thereof and when the machine is moved and this broom is put in rotation, it sweeps the dirt, &c., into a windrow extending in the direction of movement of the machine. The loading broom is located adjacent to the rear end of the diagonal sweeping broom, and is mounted on an axle extending longitudinally of the machine, thus permitting it to rotate in a plane transverse of the machine. The location of the sweeping broom and the location of the loading broom are such that the windrow of sweepings thrown up by the forward or diagonally arranged sweeping broom is delivered at the rear end of said broom into the path or track of the transversely rotating loading broom. The apron 18 being arranged in front of the loading broom and having its lower edge arranged longitudinally of the machine or in the direction of the length of the loading broom, the sweepings are delivered thereto directly by the loading broom.

By my construction and relative location and arrangement of my sweeping and loading brooms I am enabled to construct the front or diagonal sweeping broom smaller in diameter than would otherwise be practicable and rotate the same at a slower speed than the loading broom.

It is obvious that my sweeper is adapted for use upon the streets or roads or upon large floors or platforms.

What I claim as new, and desire to secure by Letters Patent of the United States, is—

1. In a sweeping machine the combination of a suitable main frame, a supplemental frame pivoted therein and a brush journaled in said supplemental frame and arranged longitudinally with the direction in which the sweeper moves and means for revolving said brush; substantially as and for the purpose set forth.

2. In a sweeping machine the combination of a suitable main frame, a pivoted supplemental frame, a brush journaled in said supplemental frame, longitudinally with the direction of movement of the sweeper, gearing for rotating said brush, a guide plate arranged in front of said brush over which the sweepings from said brush may be directed, substantially as and for the purpose set forth.

3. In a sweeping machine the combination of a main frame, a supplemental frame pivoted therein, a brush journaled in said pivoted frame and arranged to rotate transversely to the direction of movement of the sweeper, an inclined guide plate pivotally supported in the main frame and arranged with its lower edge adjacent to the under side of said brush and adapted to direct the sweepings therefrom; substantially as and for the purpose set forth.

4. In a sweeping machine the combination with a frame, a rotating brush arranged therein diagonally with reference to the direction in which the machine moves and toward its forward end, another rotating brush arranged in said frame longitudinally with the direction of the movement of the sweeper and gearing adapted to rotate such longitudinally arranged brush at a higher rate of speed than the diagonally arranged brush, and a guide plate arranged parallel with and its lower edge adjacent to the under side of said longitudinally arranged brush as and for the purpose set forth.

5. In a sweeping machine the combination with a main frame, of an inner frame pivoted at one end within the main frame, and carrying a diagonally arranged brush and a brush arranged to rotate transversely of such frame, mechanism for operating said brushes, and a suitable receptacle; substantially as and for the purpose set forth.

6. In a sweeping machine the combination of the main frame supported at both ends upon axles, a supplemental frame pivotally supported at one end upon one of said axles, rotary brushes journaled in the other end of said pivoted frame and adapted to support the same, one of said brushes being of smaller diameter than the other, gearing intermediate said brushes for rotating the one from the other at different rates of speed, substantially as and for the purpose specified.

JOHN HUDSON REYNOLDS.

Witnesses:
JOHN DONNELLY SHORT,
WILLIAM H. MCKEOGH.